Oct. 30, 1934.     H. G. BOLKCOM     1,978,892
AUTOMOBILE HEATER
Filed Dec. 26, 1929     2 Sheets-Sheet 1
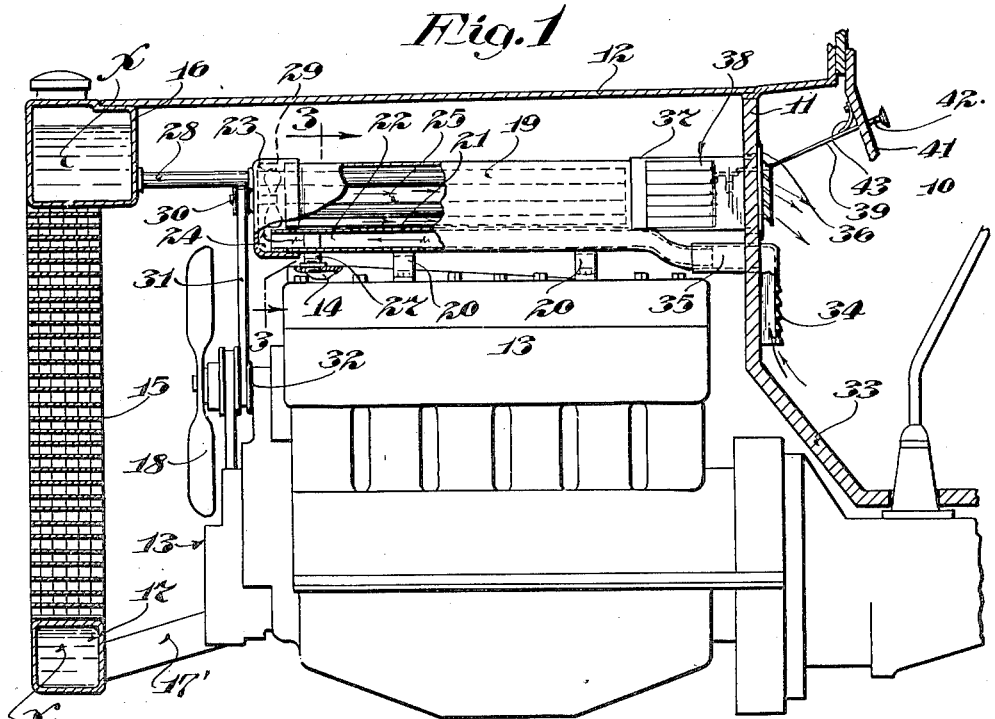
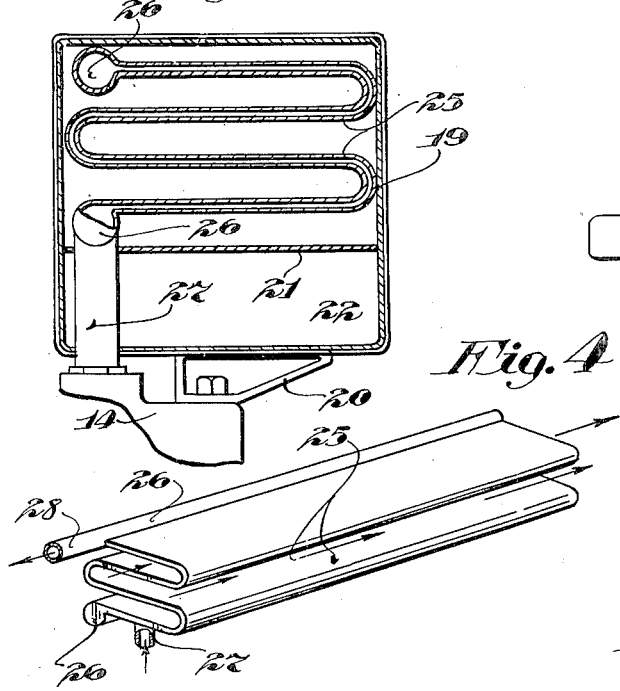
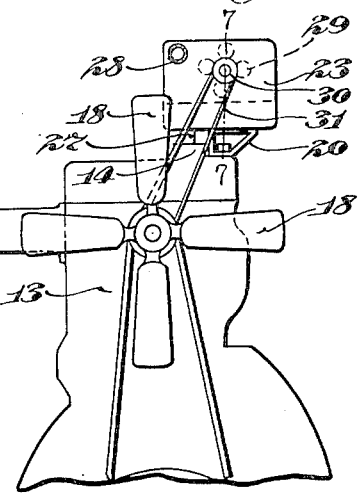
Inventor
Harry G. Bolkcom
By his Attorneys

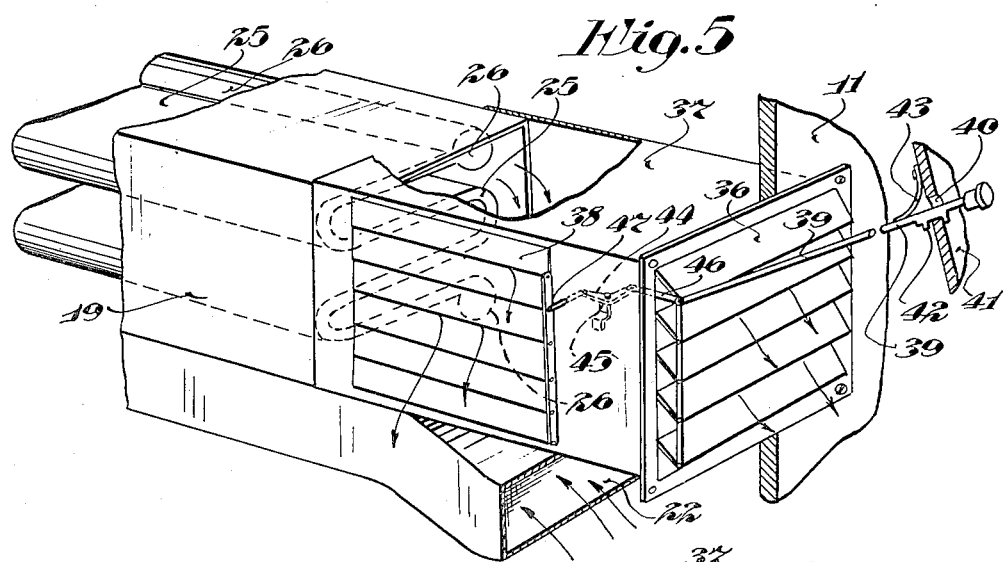
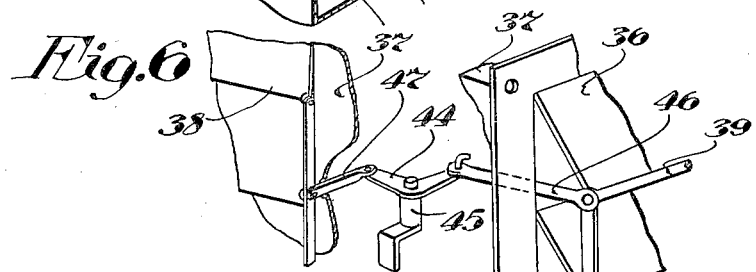
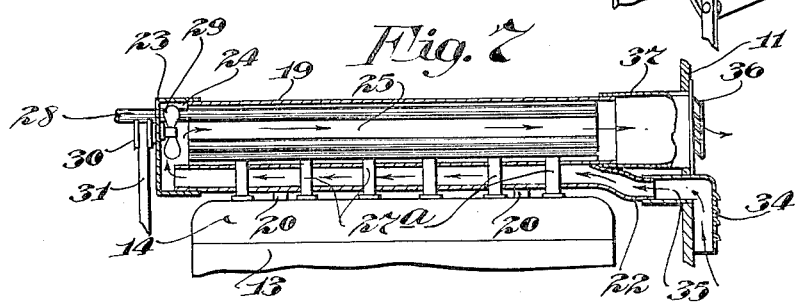
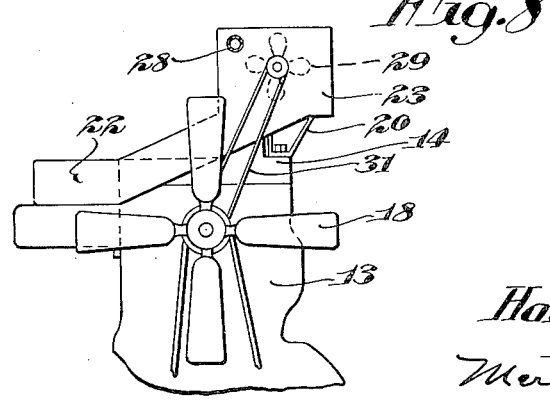

Patented Oct. 30, 1934

1,978,892

UNITED STATES PATENT OFFICE 1,978,892

AUTOMOBILE HEATER

Harry G. Bolkcom, Richfield, Minn.

Application December 26, 1929, Serial No. 416,328

1 Claim. (Cl. 257—241)

My invention has for its object the provision of a simple and highly efficient heat exchange device intended for general use on an engine having a circulating liquid-cooling system, and more particularly such an engine in an automotive vehicle.

To the above end, generally stated, the invention consists of the novel devices and combinations of devices hereinafter described and defined in the claim.

In the accompanying drawings, which illustrate the invention, like characters indicate like parts throughout the several views.

Referring to the drawings:

Fig. 1 is a fragmentary view, partly in longitudinal central section and partly in plan, showing an automotive vehicle having the invention embodied in the circulating liquid-cooling system of its engine;

Fig. 2 is a fragmentary front elevation of the engine as shown in Fig. 1;

Fig. 3 is a view partly in front end elevation and partly in transverse vertical section taken on the irregular line 3—3 of Fig. 1, on an enlarged scale;

Fig. 4 is a perspective view of the core of the heat exchange device;

Fig. 5 is a fragmentary perspective view of the heat exchange device and a portion of the vehicle, on an enlarged scale;

Fig. 6 is a fragmentary perspective view of the shutter-operating mechanism;

Fig. 7 is a view principally in longitudinal vertical section taken substantially on the line 7—7 of Fig. 2; and Fig. 8 is a view corresponding to Fig. 2, but showing a slight modification of the heat exchange device.

Of the parts of the automotive vehicle illustrated, it is important to note the body 10, cowl 11, hood 12 and engine indicated as an entirety by the numeral 13 with the exception of its liquid-cooling system which includes the engine water jacket 14, radiator 15 having upper and lower tanks 16 and 17, and fan 18. The lower tank 17 has communication with the water jacket 14, at the bottom of the engine 13, through a pipe or hose connection 17' and the water jacket 14 in the head of the engine 13 has communication with the upper tank 16 through a pipe or hose connection, not shown. The cooling liquid for the circulating system is indicated by the letter X.

Referring now in detail to the invention as shown in Figs. 1 to 7, inclusive, the numeral 19 indicates a horizontal rectangular casing which extends longitudinally over the engine 13 and is rigidly secured to brackets 20, which in turn, are rigidly secured to the head of said engine by certain of the bolts that connect said head to the engine cylinder block at the left side thereof. Within the casing 19 is a horizontal partition 21 which forms at the bottom of said casing an air intake conduit 22 the rear end portion of which extends downward and rearward from the casing 19. On the front end portions of the casing 19 and conduit 22 is a cap 23 which forms a fan housing 24 through which said conduit has communication with said casing.

Within the casing 19 and extending substantially the full length of the engine 13 is the core 25 of the heat exchange device. This core 25, as shown, is in the form of a flat tube which extends transversely of the engine 13 and the ends thereof are secured to and have communication with upper and lower headers 26 in the form of horizontal pipes. The core 25 is folded in zigzag arrangement to form vertically spaced and parallel horizontal sections connected by U-shaped bends, see Figs. 3 and 4.

A pipe 27 affords communication between the water jacket 14, in the head of the engine 13 at the front thereof, and the front end of the lower header 26. A pipe 28 affords communication between the front end of the upper header 26 and the upper tank 16. The cooling liquid X instead of flowing directly through a connection from the water jacket 14 in the head of the engine 13 to the upper tank 16 circulates through the pipe 27, core 25, header 26, and pipe 28 from said water jacket to the upper tank 16. A fan 29 is mounted in the fan housing 24 and its shaft is journaled in the cap 23 and has on its outer end a flanged pulley 30 driven by a belt 31 from a flanged pulley 32 on the shaft of the fan 18.

The structure shown in Fig. 7 is the same as that shown in the previous views with the exception that there is a plurality of pipe connections 27a between the water jacket in the head of the engine and the lower manifold 26.

The intake end of the conduit 22 has communication with the interior of the body 10, just above the floor board 33, through a shutter equipped member 34 secured to the inner face of the cowl 11 and having a thimble 35 which extends through an aperture in said cowl and is loosely telescoped onto the intake end of the conduit 22. Secured to the inner face of the cowl 11 above the member 34 is a register 36 having a long thimble 37 which extends through an aperture in the cowl 11 and is loosely telescoped onto the delivery end of the casing 19. In the left hand side of the thimble 37, forward of the cowl 11 and under the hood 12, is a register 38. Each register 36—38 is provided with a plurality of horizontal hinged shutters connected for simultaneous movements to open and close the respective register.

The shutters of the register 36 are opened and closed by means of a rod 39 flexibly connected thereto and mounted for endwise sliding movement in a passageway 40 in the instrument board 41. To hold the rod 39 with the shutters of the register 36 either open or closed said rod is provided with two longitudinally spaced lock lugs 42 arranged to engage the outer face of the instrument board 41 as a stop. A leaf spring 43 attached to the back of the instrument board 41 yieldingly engages the rod 39 and normally holds the same with one of its lock lugs 42 in engagement with said instrument board.

The shutters of the register 38 are connected to the shutters of the register 36 for simultaneous opening and closing movements, therewith, but in reverse order, by a bell-crank 44 pivoted to a bearing 45 on the thimble 37, a link 46 connecting one of the arms of said bell-crank to the shutters of the register 36 and a link 47 connecting the other arm of said bell-crank to the shutters of the register 38. The link 46 is flexibly connected to the bell-crank 44 with freedom for a limited vertical angular movement in respect thereto.

The construction shown in Fig. 8 is the same as that shown in the other views with the exception that the conduit 22 is laterally offset and overlies the exhaust manifold of the engine.

From the above description it is evident that the heat exchange device forms an auxiliary section in the circulating liquid-cooling system of the engine 13 and all of the fluid X from jacket 14 passes through this device to the upper radiator tank 16. When the shutters of the register 36—38 are set, as shown in Figs. 1 and 5, the fan 29 draws cold air from the floor of the body 10 through the member 34 and conduit 22, which overlies the hottest portion of the engine 13, where the air is pre-heated. This pre-heated air from the conduit 22 is drawn into the fan housing 24 where the same is forced through the casing 19 and into the body 10 through the register 36 and directed, by the shutters of said register, downward toward the bottom of the body 10. The air in passing through the casing 19 travels over the core of the heat exchange device for a relatively long distance and due to the width of the tube 25 and the peculiar formation thereof, said core has a very large radiating surface over which the air passes and is thereby heated to the desired temperature before entering the body 10.

The heat exchange device not only supplies sufficient heat to the vehicle, which is controlled by manipulating the shutters of the register 36, but it materially assists the circulating liquid-cooling system of the engine in cooling the engine. When the shutters of the register 36 are closed to prevent the hot air from entering the body 10, the shutters of the register 38 are automatically opened and the hot air discharged into the compartment under the hood 12 at which time the heat exchange device performs only one function to wit: the cooling of the engine 13.

During the summertime or in warm weather the register 36 will be closed and the register 38 opened. It is, of course, understood that the heat exchange device may take various different forms such as a multiplicity of tubes on which are mounted radiating fins. While the invention is shown as an attachment mounted on the hood of the engine 13 the same may be formed as a part thereof at the time of manufacture.

What I claim is:

A heat exchanger including an upper header, a lower header and a thin wide tube, the ends of which are in communication with the headers, and a compartment for the heat exchanger having intake and outlet openings, said headers being in the form of pipes that are substantially parallel, said tube being folded zigzag transversely of the headers and dividing the compartment into a plurality of passageways, the ends of the passageways being spaced from the ends of the compartment, said compartment having at one end an intake opening and at its other end an outlet opening.

HARRY G. BOLKCOM.